US012696077B2

(12) United States Patent
Metwaly Saad et al.

(10) Patent No.: US 12,696,077 B2
(45) Date of Patent: Jul. 28, 2026

(54) PERCEPTION BASED REPORTING

(71) Applicant: QUALCOMM Incorporated, San Diego, CA (US)

(72) Inventors: Hussein Metwaly Saad, San Diego, CA (US); Simone Merlin, San Diego, CA (US); Peerapol Tinnakornsrisuphap, San Diego, CA (US); Yann Lebrun, Velizy-Villacoublay (FR); Mickael Mondet, Louannec (FR)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 18/365,136

(22) Filed: Aug. 3, 2023

(65) Prior Publication Data

US 2025/0048083 A1      Feb. 6, 2025

(51) Int. Cl.
*H04W 24/10*      (2009.01)
*H04W 4/38*      (2018.01)
*H04W 8/24*      (2009.01)

(52) U.S. Cl.
CPC ............... *H04W 8/24* (2013.01); *H04W 4/38* (2018.02); *H04W 24/10* (2013.01)

(58) Field of Classification Search
CPC ......... H04W 8/24; H04W 4/38; H04W 24/10; H04W 4/50
See application file for complete search history.

(56) References Cited

U.S. PATENT DOCUMENTS

2023/0007503 A1*   1/2023  Balasubramanian ....................... H04W 24/10

FOREIGN PATENT DOCUMENTS

WO      2023097560 A1      6/2023

OTHER PUBLICATIONS

International Search Report and Written Opinion—PCT/US2024/032515—ISA/EPO—Aug. 16, 2024.

* cited by examiner

*Primary Examiner* — Chuong A Ngo
(74) *Attorney, Agent, or Firm* — Harrity & Harrity, LLP

(57) ABSTRACT

Various aspects of the present disclosure generally relate to wireless communication. In some aspects, a user equipment (UE) may transmit a capability message indicating that the UE is capable of perception with respect to a surrounding environment. The UE may receive, based at least in part on the capability message, a configuration for reporting perception information. The UE may transmit, based at least in part on the configuration, an environment awareness report that indicates the perception information. Numerous other aspects are described.

20 Claims, 8 Drawing Sheets

400

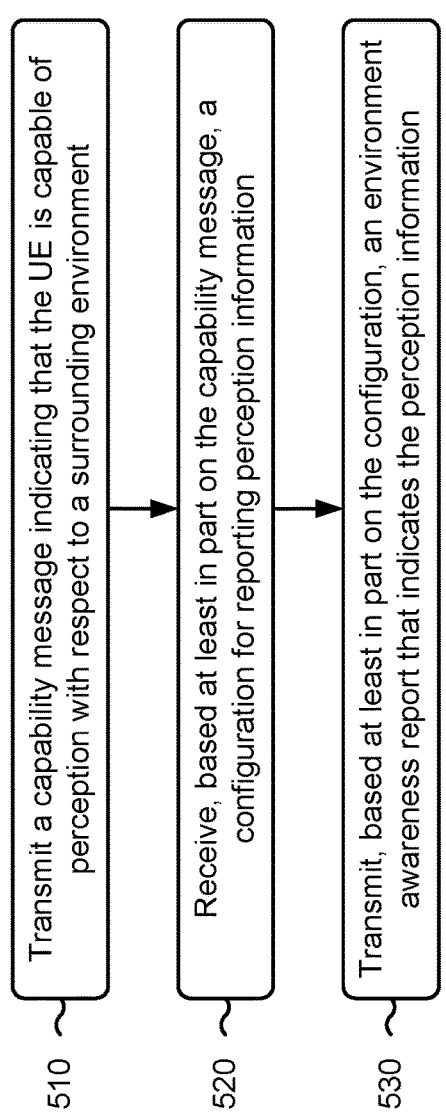

510  Transmit a capability message indicating that the UE is capable of perception with respect to a surrounding environment 520  Receive, based at least in part on the capability message, a configuration for reporting perception information 530  Transmit, based at least in part on the configuration, an environment awareness report that indicates the perception information

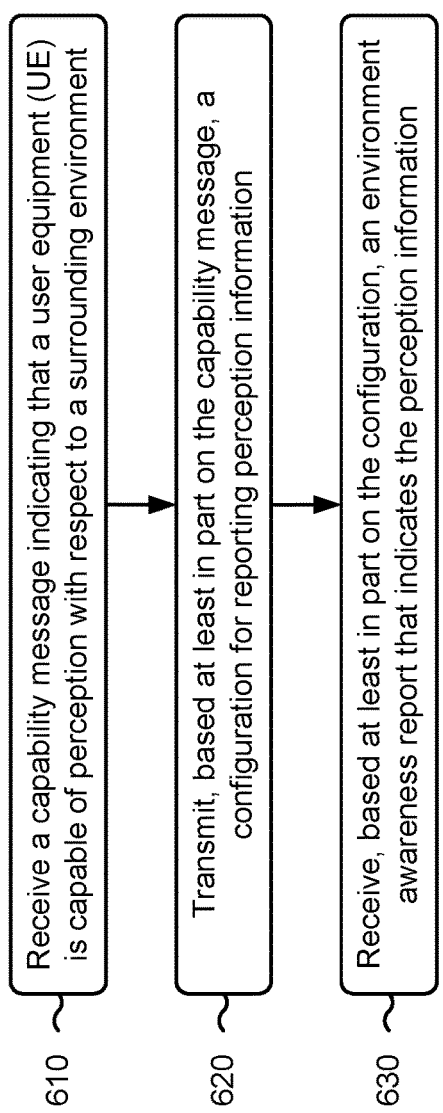

610 Receive a capability message indicating that a user equipment (UE) is capable of perception with respect to a surrounding environment 620 Transmit, based at least in part on the capability message, a configuration for reporting perception information 630 Receive, based at least in part on the configuration, an environment awareness report that indicates the perception information

PERCEPTION BASED REPORTING

FIELD OF THE DISCLOSURE

Aspects of the present disclosure generally relate to wireless communication and to techniques and apparatuses for perception based reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include one or more memories and one or more processors coupled to the one or more memories. The one or more processors may be individually or collectively configured to transmit a capability message indicating that the UE is capable of perception with respect to a surrounding environment. The one or more processors may be individually or collectively configured to receive, based at least in part on the capability message, a configuration for reporting perception information. The one or more processors may be individually or collectively configured to transmit, based at least in part on the configuration, an environment awareness report that indicates the perception information.

Some aspects described herein relate to an apparatus for wireless communication at a network node. The apparatus may include one or more memories and one or more processors coupled to the one or more memories. The one or more processors may be individually or collectively configured to receive a capability message indicating that a UE is capable of perception with respect to a surrounding environment. The one or more processors may be individually or collectively configured to transmit, based at least in part on the capability message, a configuration for reporting perception information. The one or more processors may be individually or collectively configured to receive, based at least in part on the configuration, an environment awareness report that indicates the perception information.

Some aspects described herein relate to a method of wireless communication performed by a UE. The method may include transmitting a capability message indicating that the UE is capable of perception with respect to a surrounding environment. The method may include receiving, based at least in part on the capability message, a configuration for reporting perception information. The method may include transmitting, based at least in part on the configuration, an environment awareness report that indicates the perception information.

Some aspects described herein relate to a method of wireless communication performed by a network node. The method may include receiving a capability message indicating that a UE is capable of perception with respect to a surrounding environment. The method may include transmitting, based at least in part on the capability message, a configuration for reporting perception information. The method may include receiving, based at least in part on the configuration, an environment awareness report that indicates the perception information.

Some aspects described herein relate to a non-transitory computer-readable medium that stores a set of instructions for wireless communication by a UE. The set of instructions, when executed by one or more processors of the UE, may cause the UE to transmit a capability message indicating that the UE is capable of perception with respect to a surrounding environment. The set of instructions, when executed by one or more processors of the UE, may cause the UE to receive, based at least in part on the capability message, a configuration for reporting perception information. The set of instructions, when executed by one or more processors of the UE, may cause the UE to transmit, based at least in part on the configuration, an environment awareness report that indicates the perception information.

Some aspects described herein relate to a non-transitory computer-readable medium that stores a set of instructions for wireless communication by a network node. The set of instructions, when executed by one or more processors of the network node, may cause the network node to receive a capability message indicating that a UE is capable of perception with respect to a surrounding environment. The set of instructions, when executed by one or more processors of the network node, may cause the network node to transmit, based at least in part on the capability message, a configuration for reporting perception information. The set of instructions, when executed by one or more processors of the network node, may cause the network node to receive, based at least in part on the configuration, an environment awareness report that indicates the perception information.

Some aspects described herein relate to an apparatus for wireless communication. The apparatus may include means for transmitting a capability message indicating that the apparatus is capable of perception with respect to a surrounding environment. The apparatus may include means for receiving, based at least in part on the capability message, a configuration for reporting perception information. The apparatus may include means for transmitting, based at least in part on the configuration, an environment awareness report that indicates the perception information.

Some aspects described herein relate to an apparatus for wireless communication. The apparatus may include means for receiving a capability message indicating that a UE is capable of perception with respect to a surrounding environment. The apparatus may include means for transmitting, based at least in part on the capability message, a configuration for reporting perception information. The apparatus may include means for receiving, based at least in part on the configuration, an environment awareness report that indicates the perception information.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5-6 are diagrams illustrating example processes associated with perception based reporting, in accordance with the present disclosure.

DETAILED DESCRIPTION

Figure 1:
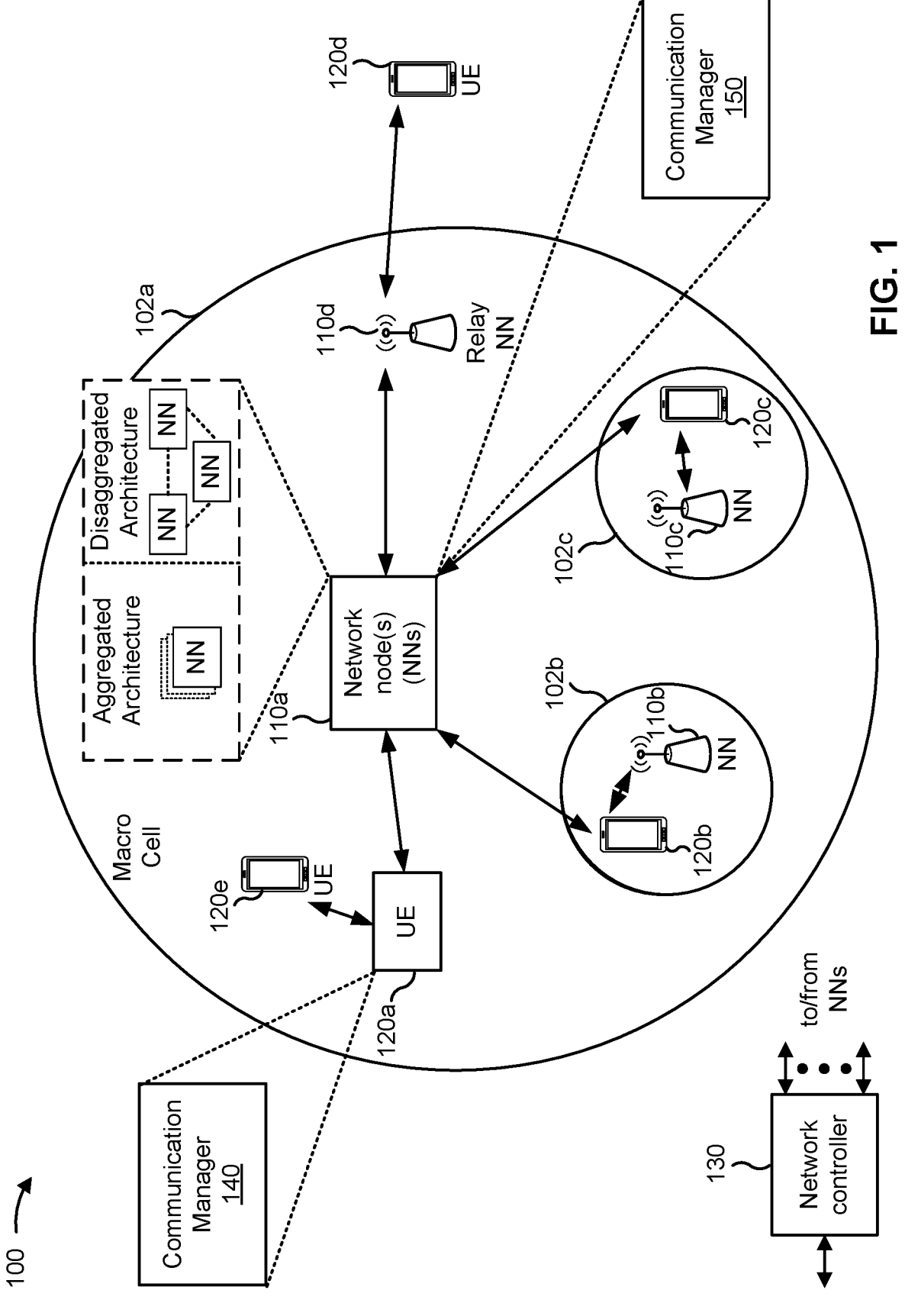
FIG. 1 is a diagram illustrating an example of a wireless network, in accordance with the present disclosure.

A wireless network may support sensing assisted communications. A sensor may be used by the wireless network (e.g., a core network, a network node, or a user equipment (UE)) to create perception (e.g., environment awareness). The sensor may provide the wireless network with an ability of environment awareness. For example, the sensor may provide information associated with a network node position, a UE position, and/or a reflector position. The sensor may provide an indication of a blockage event (e.g., an event in which an object blocks coverage or reduces a quality of coverage for the UE), a timing associated with the blockage event, a duration associated with the blockage event, and/or affected beams associated with the blockage event. The sensor may provide an indication that a handover is required and/or a timing for an optimal handover.

Environment awareness may enable sensing assisted communications in the wireless network. However, a current report configuration used by a UE to perform reporting to a network node, or vice versa, does not exploit this capability for improving reporting. For example, the current reporting configuration does not support reporting information associated with environment awareness within the wireless network (e.g., from a UE to a network node, or vice versa). The current report configuration does not support reporting the positions of UEs, network nodes, and/or reflectors. The current report configuration does not support sensing triggered reports. A sensing triggered report may be associated with a severe blockage event in which a signal strength drops by more than X dB, or a high motion event in which a user is moving or rotating at a relatively high speed. The current report configuration may not permit the UE and/or the network node to transmit, to each other, information associated with environment awareness and/or sensing triggered reports (e.g., reports based at least in part on a sensing of an environment, or reports based at least in part on the environment awareness). As a result, the UE and/or the network node may be unable to benefit from environment awareness sensed by other devices. For example, the UE may be unable to use perception created using sensors of the network node, and vice versa. The UE and/or the network node may be limited to perception created using their own sensors, which may degrade a performance of the UE and/or the network node.

Various aspects relate generally to perception based reporting. Some aspects more specifically relate to configuring a UE to report perception information, which may enable a network node to appropriately perform actions based at least in part on the perception information. In some examples, the UE may transmit, to the network node, a capability message indicating that the UE is capable of perception with respect to a surrounding environment. The capability message may indicate one or more sensors associated with the UE. The one or more sensors may enable the UE to perceive the surrounding environment. The capability message may indicate a type of perception for which the UE is capable. The UE may receive, from the network node and based at least in part on the capability message, a configuration for reporting perception information (e.g., environment awareness information, which may include sensor information). The configuration for reporting perception information may configure the UE to report static information and/or dynamic information to the network node. The configuration for reporting perception information may support signaling related to sensing by the UE. The UE may transmit, to the network node and based at least in part on the configuration, an environment awareness report that indicates the perception information. The environment awareness report may be triggered based at least in part on an event, which may be detected or predicted by the UE based at least in part on captured perception information. The environment awareness report may be initiated by the UE. As a result, perception information, detected by the UE, may be indicated to the network node, which may then be able to perform actions based at least in part on the perception information.

Particular aspects of the subject matter described in this disclosure can be implemented to realize one or more of the following potential advantages. In some examples, by configuring the UE to report perception information, the described techniques can be used to perform network actions depending on the perception information. The network node may receive the environment awareness report. The network node may perform the action based at least in part on the environment awareness report. For example, the network node may perform a beam switching, a link adaptation, and/or a handover based at least in part on the environment awareness report. The network node may utilize the UE's perception capability in order to perform the action. Without an ability to utilize the UE's perception capability, the network node may not appropriately perform the beam switching, the link adaptation, and/or the handover because the network node may be limited to its own sensing/ perception capability. As a result, an ability to configure the UE to share its perception information may improve an overall performance of the UE and/or the network node.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components.

In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include midband frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may transmit a capability message indicating that the UE is capable of perception with respect to a surrounding environment; receive, based at least in part on the capability message, a configuration for reporting perception information; and transmit, based at least in part on the configuration, an environment awareness report that indicates the perception information. Additionally, or alternatively, the communication manager 140 may perform one or more other operations described herein.

In some aspects, a network node (e.g., the network node 110) may include a communication manager 150. As described in more detail elsewhere herein, the communication manager 150 may receive a capability message indicating that a UE is capable of perception with respect to a surrounding environment; transmit, based at least in part on the capability message, a configuration for reporting perception information; and receive, based at least in part on the configuration, an environment awareness report that indicates the perception information. Additionally, or alternatively, the communication manager 150 may perform one or more other operations described herein.

As indicated above, FIG. 1 is provided as an example. Other examples may differ from what is described with regard to FIG. 1.

Figure 2:
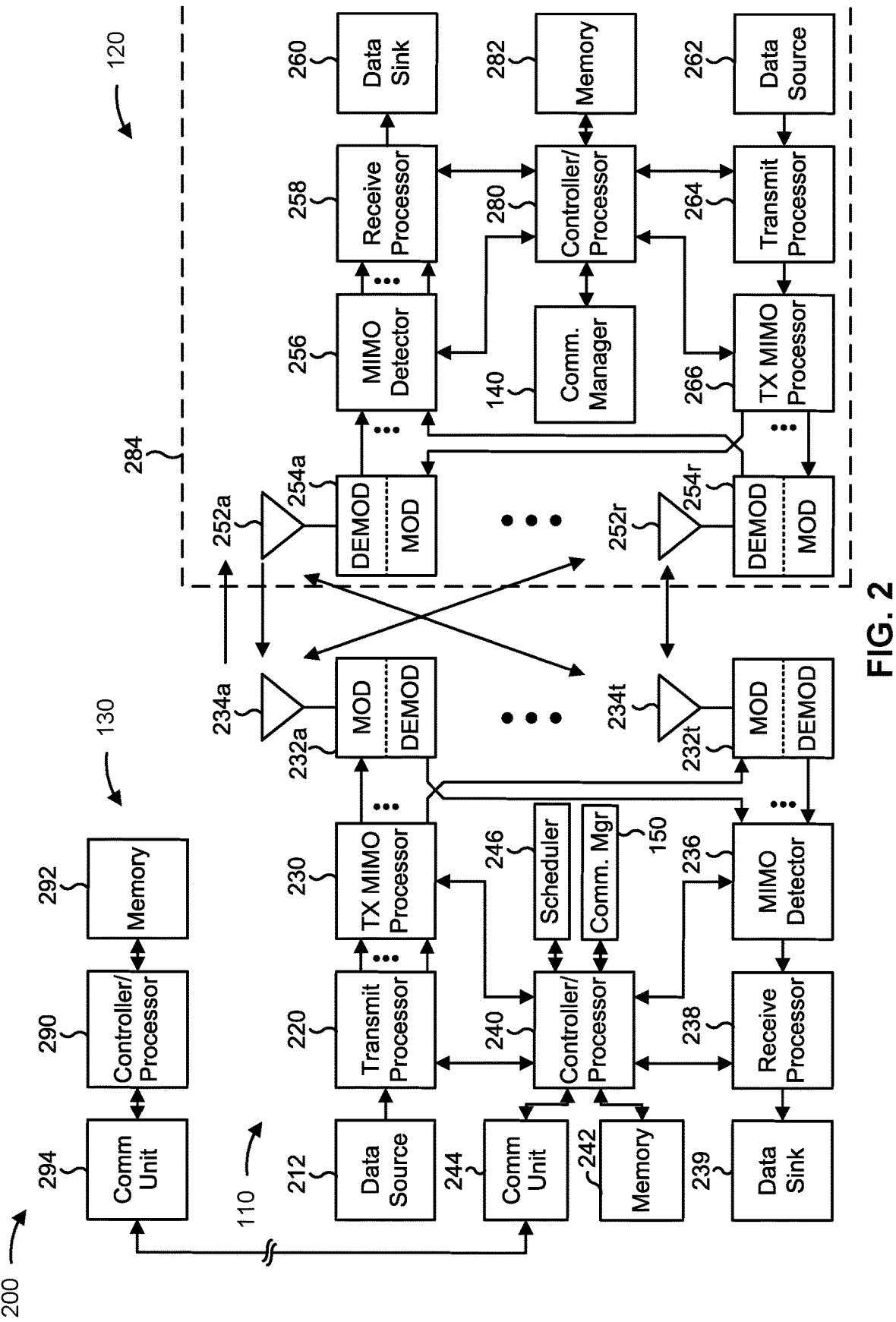
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the network node 110, the controller/processor 280 of the UE 120, and/or any other component(s) of FIG. 2 may perform one or more techniques associated with perception based reporting, as described in more detail elsewhere herein. For example, the controller/processor 240 of the network node 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, a UE (e.g., the UE 120) includes means for transmitting a capability message indicating that the UE is capable of perception with respect to a surrounding environment; means for receiving, based at least in part on the capability message, a configuration for reporting perception information; and/or means for transmitting, based at least in part on the configuration, an environment awareness report that indicates the perception information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node) includes means for receiving a capability message indicating that a UE is capable of perception with respect to a surrounding environment; means for transmitting, based at least in part on the capability message, a configuration for reporting perception information; and/or means for receiving, based at least in part on the configuration, an environment awareness report that indicates the perception information. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
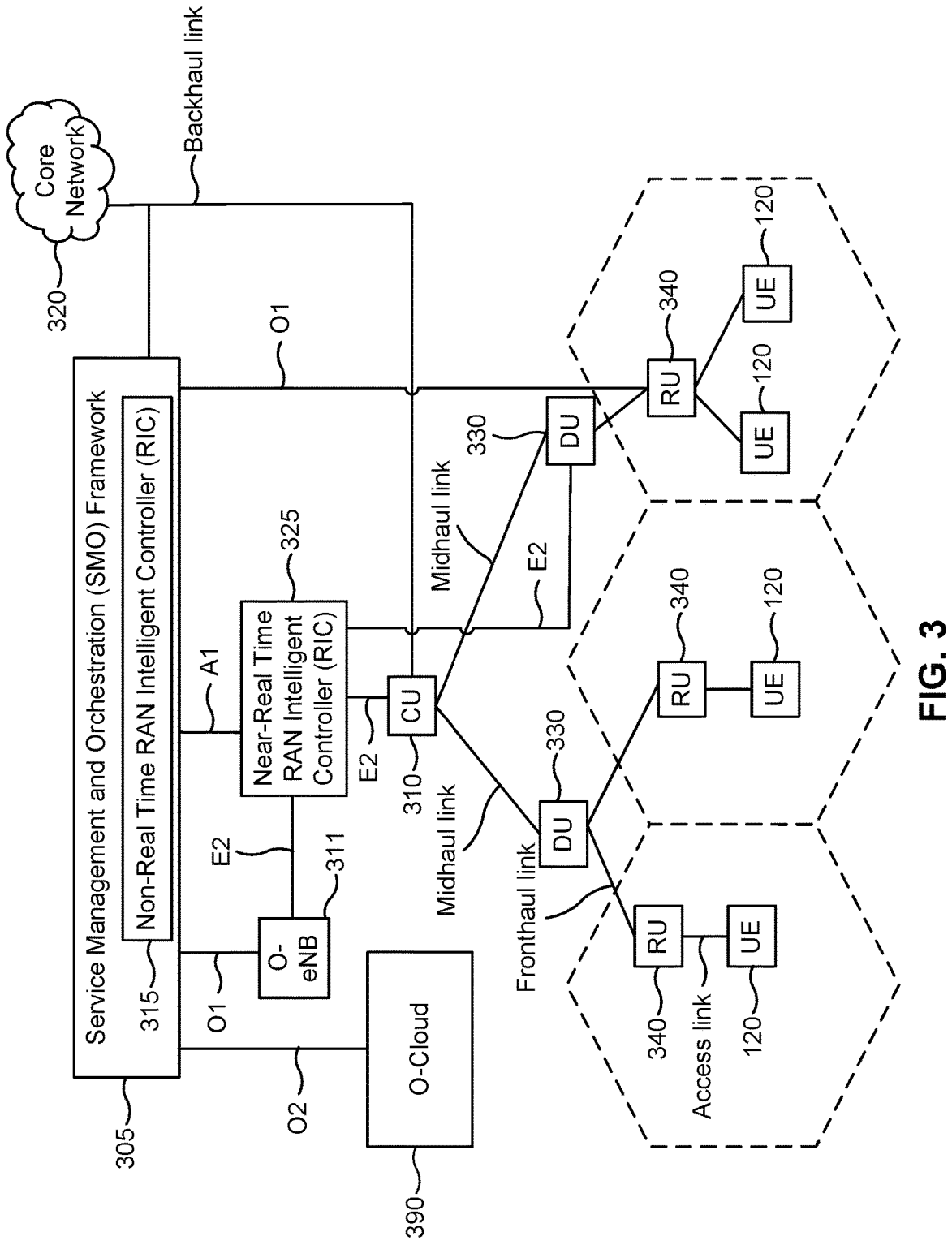
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

A UE may be configured with a certain number of channel state information (CSI) reports, where each CSI report may be associated with a certain functionality, such as beam management, mobility, and/or channel state feedback. The UE may transmit a CSI report to a network node in accordance with a CSI report configuration. The UE may transmit the CSI report in a periodic manner (e.g., the UE may transmit the report every X slots). The UE may transmit the CSI report based at least in part on a downlink control information (DCI) trigger (e.g., the UE may transmit the CSI report Y slots after receiving a DCI command that triggers the CSI report). In this case, the CSI report may be a DCI-triggered CSI report. The UE may transmit the CSI report based at least in part on an event trigger (e.g., the UE may transmit the CSI report Z slots after an occurrence of a certain event). In this case, the CSI report may be an event-triggered CSI report.

A wireless network, such as a 5G wireless network, may support sensing assisted communications. A sensor may be used by the wireless network (e.g., a core network, a network node, or a UE) to create perception (e.g., environment awareness). The sensor may be an RF sensing device, a camera, a location sensor, a radar sensor, a light detection and ranging (LIDAR) sensor, an inertial measurement unit (IMU), and/or a 6 degrees of freedom (6DoF) sensor. The sensor may provide the wireless network with an ability of environment awareness. For example, the sensor may provide information associated with a network node position, a UE position, and/or a reflector position. The sensor may provide an indication of a blockage event (e.g., an event in which an object blocks coverage or reduces a quality of coverage for the UE), a timing associated with the blockage event, a duration associated with the blockage event, and/or affected beams associated with the blockage event. The sensor may provide an indication that a handover is required and/or a timing for an optimal handover.

Environment awareness may be used to optimize network parameters. A UE may use its own sensors to obtain an environment awareness, and then optimize its beam selection mechanism accordingly. The UE may optimize the beam selection mechanism based at least in part on the environment awareness. For example, the UE may predict, based at least in part on the environment awareness, that a blockage is expected to occur in a next 100 ms, and then change its beam to avoid blockage. The UE may use its own sensors to obtain an environment awareness, optimize its beam selection based at least in part on the environment awareness, and then send its environment awareness to a network node, such that the network node is able to optimize its own beam selection. For example, the UE may transmit a blockage indication to the network node. The network node may use its own sensors to obtain an environment awareness, optimize its beam selection based at least in part on the environment awareness, and then send its environment awareness to the UE, such that the UE is able to optimize its own beam selection. The network node may collect sensor information from multiple UEs to generate an environment awareness, and then send its environment awareness to the multiple UEs.

The UE and/or the network node, when using its sensors to obtain an environment awareness, may determine an RF map. The RF map may be a map of three dimensional (3D) positions of strongest anchors in an RF environment. An anchor may be a signal source, which may be an antenna at a network node or an RF reflector. The anchor may be a representation of the RF environment. The RF map may also include a signal quality at different 3D positions and/or poses. The signal quality may be associated with an RSRP, a signal-to-interference-plus-noise ratio (SINR), and/or a channel quality indicator (CQI).

Environment awareness may enable sensing assisted communications in the wireless network. However, a current report configuration used by a UE to perform reporting to a network node, or vice versa, does not exploit this capability for improving reporting. For example, the current reporting configuration does not support reporting information associated with environment awareness within the wireless network (e.g., from a UE to a network node, or vice versa). The current report configuration does not support reporting the positions of UEs, network nodes, and/or reflectors. The current report configuration does not support sensing triggered reports. A sensing triggered report may be associated with a severe blockage event in which a signal strength drops by more than X dB, or a high motion event in which a user is moving or rotating at a relatively high speed. The current report configuration may not permit the UE and/or the network node to transmit, to each other, information associated with environment awareness and/or sensing triggered reports (e.g., reports based at least in part on a sensing of an environment, or reports based at least in part on the environment awareness). As a result, the UE and/or the network node may be unable to benefit from environment awareness sensed by other devices. For example, the UE may be unable to use perception created using sensors of the network node, and vice versa. The UE and/or the network node may be limited to perception created using their own sensors, which may degrade a performance of the UE and/or the network node.

In various aspects of techniques and apparatuses described herein, a UE may transmit, to a network node, a capability message indicating that the UE is capable of perception with respect to a surrounding environment. The capability message may indicate one or more sensors associated with the UE. The one or more sensors may enable the UE to perceive the surrounding environment. The capability message may indicate a type of perception for which the UE is capable. The UE may receive, from the network node and based at least in part on the capability message, a configuration for reporting perception information (e.g., environment awareness information, which may include sensor information). The configuration for reporting perception information may configure the UE to report static information and/or dynamic information to the network node. The configuration for reporting perception information may support signaling related to sensing by the UE. The UE may transmit, to the network node and based at least in part on the configuration, an environment awareness report that indicates the perception information. The environment awareness report may be triggered based at least in part on an event, which may be detected or predicted by the UE based at least in part on captured perception information. The environment awareness report may be initiated by the UE. As a result, perception information, detected by the UE, may be indicated to the network node, which may then be able to perform actions based at least in part on the perception information.

In some aspects, the network node may receive the environment awareness report. The network node may perform the action based at least in part on the environment awareness report. For example, the network node may perform a beam switching, a link adaptation, and/or a handover based at least in part on the environment awareness report. The network node may utilize the UE's perception capability in order to perform the action. Without an ability to utilize the UE's perception capability, the network node may not appropriately perform the beam switching, the link adaptation, and/or the handover because the network node may be limited to its own sensing/perception capability. For example, the environment awareness report may indicate a severe blockage event or a high motion event (e.g., a user is moving or rotating at a relatively high speed), which would otherwise be undetectable by the network node. As a result, an ability to configure the UE to share its perception information may improve an overall performance of the UE and/or the network node.

Figure 4:
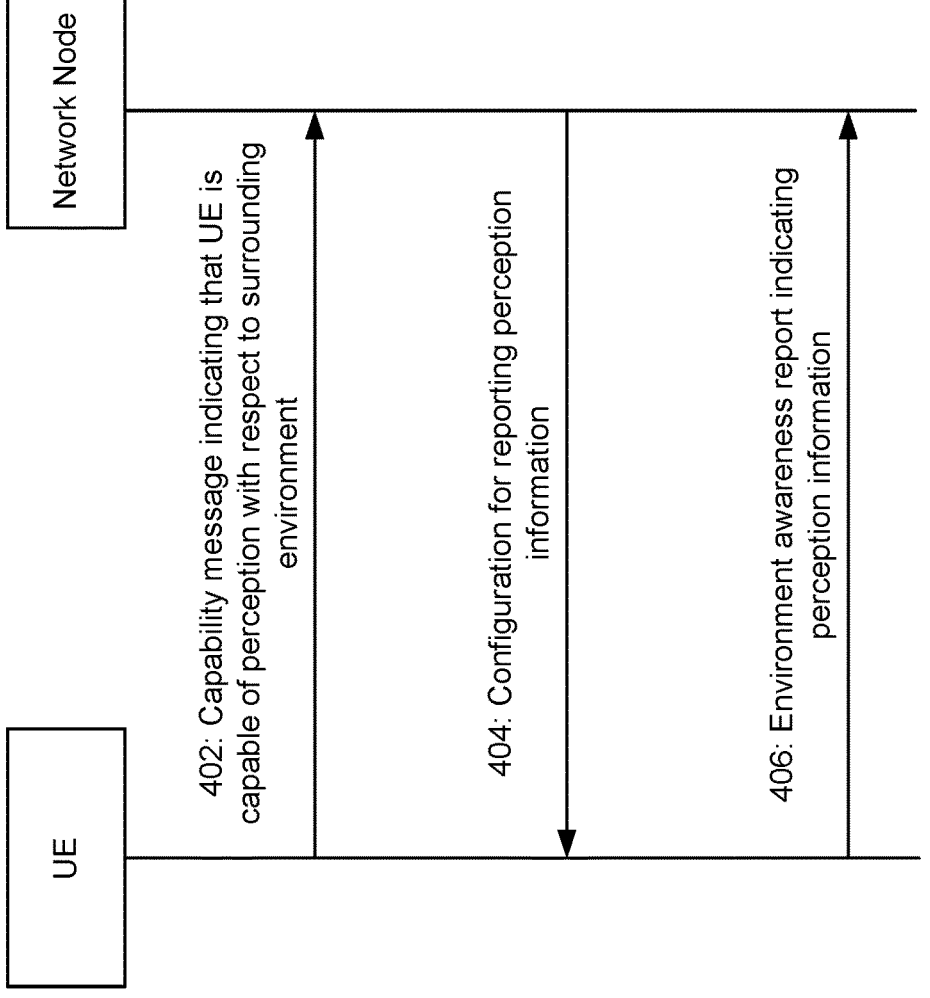
FIG. 4 is a diagram illustrating an example associated with perception based reporting, in accordance with the present disclosure.

FIG. 4 is a diagram illustrating an example 400 associated with perception based reporting, in accordance with the present disclosure. As shown in FIG. 4, example 400 includes communication between a UE (e.g., UE 120) and a network node (e.g., network node 110). In some aspects, the UE and the network node may be included in a wireless network, such as wireless network 100.

As shown by reference number 402, the UE may transmit, to the network node, a capability message (or a UE capability message) indicating that the UE is capable of perception with respect to a surrounding environment. The capability message may indicate one or more sensors associated with the UE. The one or more sensors may enable the UE to perceive the surrounding environment. The capability message may indicate a type of perception for which the UE is capable. The type of perception may be an anchor estimation (e.g., a signal source estimation) and/or a blockage prediction (e.g., a prediction or detection of whether a transmission or a reception is blocked by an object in the surrounding environment).

In some aspects, for environment awareness reporting, signaling may be defined to facilitate sharing, creating, maintaining, and/or updating environment awareness within a wireless network. In some aspects, the capability message may indicate, to the network node, sensors associated with the UE. The capability message may indicate which sensors are available to the UE. When the UE is capable of perception (e.g., creating some environment awareness), the UE may indicate that the UE is capable of perception in the capability message to inform the network node. The UE may indicate, via the capability message, the type of sensors associated with the UE (e.g., camera, position sensor, pose sensor, IMU, LIDAR sensor, and/or radar sensor). As a result, the network node may be aware that the UE is capable of perception and/or the type of perception. For example, a UE with a camera sensor may be capable of vision-based blockage detection, whereas a UE with no camera sensor may not be capable of vision-based blockage detection.

In some aspects, the UE capability message may indicate the kind of perception or environment awareness that the UE is able to perform or create. When the UE is capable of perception (e.g., creating some environment awareness), the UE may indicate that the UE is capable of perception in the UE capability message to inform the network node. For example, the UE capability message may indicate that the UE is capable of performing an anchor estimation and/or a blockage prediction, which may correspond to the kind of perception or environment awareness that is capable by the UE. As a result, the network node may be aware that the UE is capable of perception and/or the type of perception.

As shown by reference number 404, the UE may receive, based at least in part on the capability message, a configuration for reporting perception information. The configuration for reporting perception information may configure the UE to report sensor information, RF map information that indicates anchor positions, and/or information regarding static blockers. The configuration for reporting perception information may configure the UE to report static information. The UE may transmit, to the network node, the static information via an RRC layer 3 (L3) report. The configuration for reporting perception information may configure the UE to report dynamic information. The UE may transmit, to the network node, the dynamic information via a layer 1 (L1) report or a layer 2 (L2) report In some aspects, a reporting environment awareness configuration may be defined. Signaling may be needed to share perception or environment awareness within the wireless network. In some aspects, the UE may receive, from the network node, an RRC configuration, which may indicate the reporting environment awareness configuration. The UE, based at least in part on the reporting environment awareness configuration, may be configured to report raw sensor information (e.g., which sensors are supported by the UE), RF map information (e.g., anchor positions), and/or static blockers. The UE, based at least in part on the reporting environment awareness configuration, may be configured to report such information when a certain criterion is satisfied or when a certain event occurs.

In some aspects, the UE may use a certain report format to report, to the network node, the raw sensor information, the RF map information, and/or the static blockers. The UE may transmit, to the network node, static information via an RRC L3 report. The static information may include an indication of static blockers and/or initial anchor positions). The UE may transmit, to the network node, dynamic information via an L1/L2 report. The dynamic information may include an indication of dynamic blockers and/or new/updated anchor positions).

As an example, for a certain slot number, the UE may indicate a first anchor associated with a position of [x1,y1, z1] and a first synchronization signal block (SSB). The UE may indicate a second anchor associated with a position of [x2,y2,z2] and a second SSB. The UE may indicate a first blocker associated with a position of [x1,y1,z1]. The UE may indicate a second blocker associated with a position of [x2,y2,z2].

In some aspects, the UE may receive, from the network node and via DCI, a MAC control element (MAC-CE), and/or an upper layer protocol, signaling that indicates perception information, where the perception information may be associated with the network node. In other words, the network node may capture the perception information instead of the UE. The network node may use the DCI, the MAC-CE, and/or the upper layer protocol to signal, to the UE, the raw sensor information, the RF map information, and/or the static blockers. The network node may use the DCI, the MAC-CE, and/or the upper layer protocol to signal, to the UE, the static information (e.g., the indication of static blockers and/or the initial anchor positions) and/or the dynamic information (e.g., the indication of dynamic blockers and/or the new/updated anchor positions).

As shown by reference number 406, the UE may transmit, to the network node and based at least in part on the configuration, an environment awareness report that indicates the perception information. The UE may capture, via one or more sensors (e.g., the RF sensing device, the camera, the location sensor, the radar sensor, the LIDAR sensor, the IMU, and/or the 6DoF sensor), sensor information and/or the perception information. The UE may detect or predict an event based at least in part on the sensor information and/or the perception information. The UE may trigger the environment awareness report based at least in part on the event. The environment awareness report may indicate the sensor information, the perception information, and/or the detected or predicted event. The event may be associated with a detection or prediction of a blockage. The event may be associated with a detection or a prediction of a motion speed. The event may be associated with a detection or a prediction of a location within or outside a certain area. The event may be associated with a detection or a prediction of an expected handover. The environment awareness report may be initiated by the UE. In other words, the environment awareness report may be a perception based triggered report.

In some aspects, the network node may receive the environment awareness report. The network node may perform an action based at least in part on the environment awareness report. The action may be associated with optimizing a wireless link. For example, the network node may perform a beam switching, a link adaptation, and/or a handover based at least in part on the environment awareness report. The network node may utilize the UE's perception capability in order to perform the action. Without an ability to utilize the UE's perception capability, the network node may not appropriately perform the beam switching, the link adaptation, and/or the handover because the network node may be limited to its own sensing/perception capability. As a result, an ability to configure the UE to share its perception information may improve an overall performance of the UE and/or the network node.

In some aspects, the UE may be configured with reports that are triggered under certain conditions (e.g., an occurrence of an A3 event). The UE may be configured with a certain number of reference signals (e.g., an SSB and/or a channel state information reference signal (CSI-RS)) to measure and monitor for multiple cells (e.g., a primary cell (PCell) and one or more secondary cells (SCells)). When a strength of a reference signal on the SCell become more than a strength of a reference signal on the PCell, the UE may trigger an A3 report indicating the event.

In some aspects, for perception based triggered reports, perception at the UE may provide the UE with a capability of predicting certain events, which may trigger environment aware reports. The UE may transmit the environment aware report to the network node. The environment aware report may indicate that a relatively severe blockage is detected, which may result in an expected RSRP drop of more than X dBs. The environment aware report may indicate a duration of the blockage and/or a position of a blocker (e.g., an object that causes the blockage). The environment aware report may indicate a motion speed that exceeds a threshold, where the motion speed may be based at least in part on a translation and a rotation. The environment aware report may indicate the location within or outside the certain area. The environment aware report may indicate the expected handover of the UE.

In some aspects, the UE may trigger the environment aware report on its own without having to wait for a command (e.g., DCI) from the network node. The environment aware report, as received from the UE, may allow the network node to improve a beam switching, a link adaptation (e.g., an MCS changing), and/or a handover. A historical reporting configuration does not support such reporting configuration nor a UE report format, so the UE report format should be defined for the UE.

In some aspects, the network node may transmit, to the UE, an RRC configuration, which may indicate an event, measurements to be obtained for the event, and/or measurements to be reported by the UE to the network node. For example, the network node may transmit, to the UE, a report configuration (reportConfig), which may be a report configuration for NR (reportConfigNR). The report configuration may indicate a report type (reportType), which may be an event triggered (eventTriggered) report type. The report type may be associated with an event identifier (ID) (eventId) (e.g., eventP3). The event ID may be associated with a P3 offset RSRP (e.g., 15, which may correspond to an RSRP drop due to blockage). The event ID may be associated with a time to trigger (timeToTrigger) (e.g., 640 ms). The report type may be associated with a reference signal type (rsType) (e.g., SSB). The report type may be associated with a report quantity (reportQuantity). The report quantity may be associated with an RSRP, which may be set to true.

In some aspects, the UE report format may indicate a position/speed associated with the UE. The UE report format may include a blocker indication, a timing, a location, and/or affected beams. A UE report may be transmitted via L1, L2, or L3 signaling. For example, for a certain slot number, the UE report format may include a UE mobility (e.g., high) and an indication of blockers.

In some aspects, the UE may transmit, to the network node, first perception information. At a later point in time, the first perception information may become stale (e.g., no longer valid). The UE may transmit, to the network node, a cancellation report indicating second perception information that overrides the first perception information. In some aspects, the cancellation report may be needed. The cancellation report may override a previous report (e.g., a previous perception based triggered report). For example, when the UE reports a time T that a neighboring cell will get stronger than a serving cell at T+100 ms, but at T+50 ms, a new prediction shows that the neighboring cell will no longer get stronger than the serving cell, the UE may transmit the cancellation report to override its previous prediction.

As indicated above, FIG. 4 is provided as an example. Other examples may differ from what is described with regard to FIG. 4.

FIG. 5 is a diagram illustrating an example process 500 performed, for example, at a UE or an apparatus of a UE, in accordance with the present disclosure. Example process 500 is an example where the apparatus or the UE (e.g., UE 120) performs operations associated with perception based reporting.

As shown in FIG. 5, in some aspects, process 500 may include transmitting a capability message indicating that the UE is capable of perception with respect to a surrounding environment (block 510). For example, the UE (e.g., using transmission component 704 and/or communication manager 706, depicted in FIG. 7) may transmit a capability message indicating that the UE is capable of perception with respect to a surrounding environment, as described above.

As further shown in FIG. 5, in some aspects, process 500 may include receiving, based at least in part on the capability message, a configuration for reporting perception information (block 520). For example, the UE (e.g., using reception component 702 and/or communication manager 706, depicted in FIG. 7) may receive, based at least in part on the capability message, a configuration for reporting perception information, as described above.

As further shown in FIG. 5, in some aspects, process 500 may include transmitting, based at least in part on the configuration, an environment awareness report that indicates the perception information (block 530). For example, the UE (e.g., using transmission component 704 and/or communication manager 706, depicted in FIG. 7) may transmit, based at least in part on the configuration, an environment awareness report that indicates the perception information, as described above.

Process 500 may include additional aspects, such as any single aspect or any combination of aspects described below and/or in connection with one or more other processes described elsewhere herein.

In a first aspect, the capability message indicates one or more sensors associated with the UE, and the one or more sensors enable the UE to perceive the surrounding environment.

In a second aspect, alone or in combination with the first aspect, the capability message indicates a type of perception for which the UE is capable.

In a third aspect, alone or in combination with one or more of the first and second aspects, the configuration for reporting perception information configures the UE to report one or more of sensor information, RF map information that indicates anchor positions, or information regarding static blockers.

In a fourth aspect, alone or in combination with one or more of the first through third aspects, the configuration for reporting perception information configures the UE to report static information, and the static information is transmitted via an RRC L3 report.

In a fifth aspect, alone or in combination with one or more of the first through fourth aspects, the configuration for reporting perception information configures the UE to report dynamic information, and the dynamic information is transmitted via an L1 report or an L2 report.

In a sixth aspect, alone or in combination with one or more of the first through fifth aspects, process 500 includes receiving, via DCI, a MAC-CE, or an upper layer protocol, signaling that indicates perception information.

In a seventh aspect, alone or in combination with one or more of the first through sixth aspects, process 500 includes capturing, via one or more sensors, sensor information, and detecting or predicting an event based at least in part on the sensor information, wherein the environment awareness report is triggered based at least in part on the event.

In an eighth aspect, alone or in combination with one or more of the first through seventh aspects, the environment awareness report is initiated by the UE, and the environment awareness report is a perception based triggered report.

In a ninth aspect, alone or in combination with one or more of the first through eighth aspects, the perception information is first perception information, and process 500 includes transmitting a cancellation report indicating second perception information that overrides the first perception information.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, at a network node or an apparatus of a network node, in accordance with the present disclosure. Example process 600 is an example where the apparatus or the network node (e.g., network node 110) performs operations associated with perception based reporting.

As shown in FIG. 6, in some aspects, process 600 may include receiving a capability message indicating that a UE is capable of perception with respect to a surrounding environment (block 610). For example, the network node (e.g., using reception component 802 and/or communication manager 806, depicted in FIG. 8) may receive a capability message indicating that a UE is capable of perception with respect to a surrounding environment, as described above.

As further shown in FIG. 6, in some aspects, process 600 may include transmitting, based at least in part on the capability message, a configuration for reporting perception information (block 620). For example, the network node (e.g., using transmission component 804 and/or communication manager 806, depicted in FIG. 8) may transmit, based at least in part on the capability message, a configuration for reporting perception information, as described above.

As further shown in FIG. 6, in some aspects, process 600 may include receiving, based at least in part on the configuration, an environment awareness report that indicates the perception information (block 630). For example, the network node (e.g., using reception component 802 and/or communication manager 806, depicted in FIG. 8) may receive, based at least in part on the configuration, an environment awareness report that indicates the perception information, as described above.

Process 600 may include additional aspects, such as any single aspect or any combination of aspects described below and/or in connection with one or more other processes described elsewhere herein.

In a first aspect, process 600 includes performing an action based at least in part on the environment awareness report.

In a second aspect, alone or in combination with the first aspect, the capability message indicates one or more sensors associated with the UE, and the one or more sensors enable the UE to perceive the surrounding environment.

In a third aspect, alone or in combination with one or more of the first and second aspects, the capability message indicates a type of perception for which the UE is capable.

In a fourth aspect, alone or in combination with one or more of the first through third aspects, the configuration for reporting perception information configures the UE to report one or more of sensor information, RF map information that indicates anchor positions, or information regarding static blockers.

In a fifth aspect, alone or in combination with one or more of the first through fourth aspects, the configuration for reporting perception information configures the UE to report static information, and the static information is received via an RRC L3 report.

In a sixth aspect, alone or in combination with one or more of the first through fifth aspects, the configuration for reporting perception information configures the UE to report dynamic information, and the dynamic information is received via an L1 report or an L2 report.

In a seventh aspect, alone or in combination with one or more of the first through sixth aspects, process 600 includes transmitting, via DCI, a MAC-CE, or an upper layer protocol, signaling that indicates perception information.

In an eighth aspect, alone or in combination with one or more of the first through seventh aspects, the environment awareness report is initiated by the UE, and the environment awareness report is a perception based triggered report.

In a ninth aspect, alone or in combination with one or more of the first through eighth aspects, the perception information is first perception information, and further comprising receiving a cancellation report indicating second perception information that overrides the first perception information.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
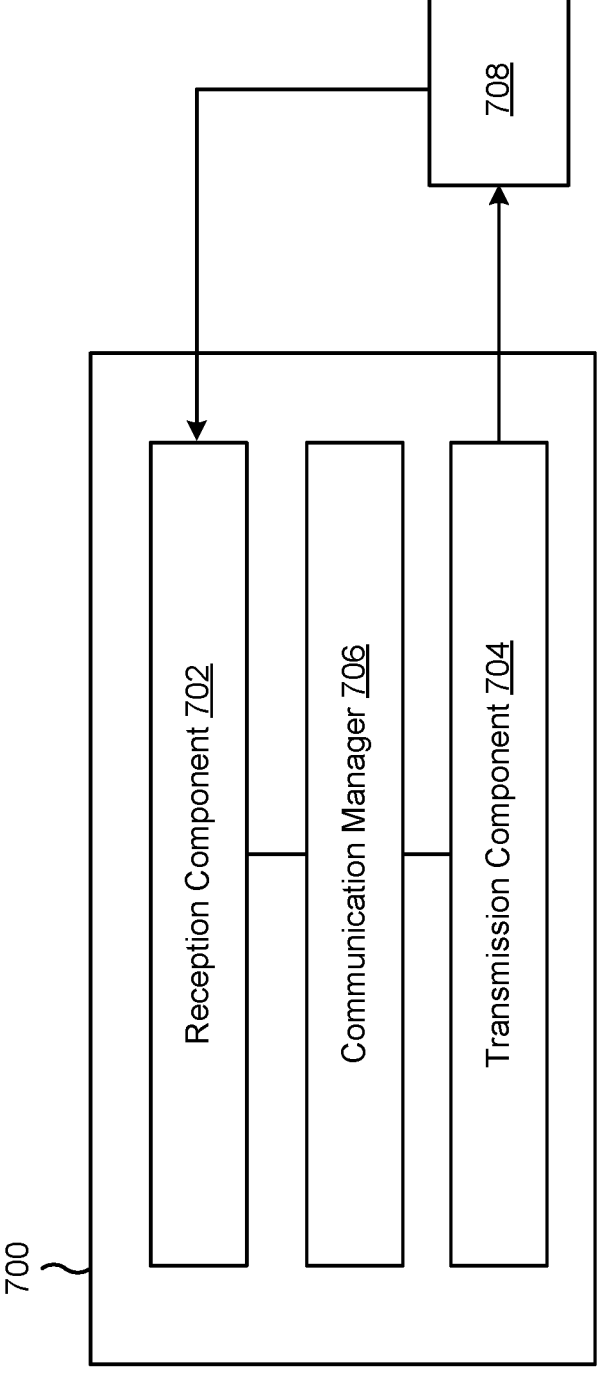
FIGS. 7-8 are diagrams of example apparatuses for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702, a transmission component 704, and/or a communication manager 706, which may be in communication with one another (for example, via one or more buses and/or one or more other components). In some aspects, the communication manager 706 is the communication manager 140 described in connection with FIG. 1. As shown, the apparatus 700 may communicate with another apparatus 708, such as a UE or a network node (such as a CU, a DU, an RU, or a base station), using the reception component 702 and the transmission component 704.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 702 may receive communications, such as reference signals, control information, data communications, or a combination thereof, from the apparatus 708. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 704 may transmit communications, such as reference signals, control information, data communications, or a combination thereof, to the apparatus 708. In some aspects, one or more other components of the apparatus 700 may generate communications and may provide the generated communications to the transmission component 704 for transmission to the apparatus 708. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 704 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 704 may be co-located with the reception component 702 in one or more transceivers.

The communication manager 706 may support operations of the reception component 702 and/or the transmission component 704. For example, the communication manager 706 may receive information associated with configuring reception of communications by the reception component 702 and/or transmission of communications by the transmission component 704. Additionally, or alternatively, the communication manager 706 may generate and/or provide control information to the reception component 702 and/or the transmission component 704 to control reception and/or transmission of communications.

The transmission component 704 may transmit a capability message indicating that the UE is capable of perception with respect to a surrounding environment. The reception component 702 may receive, based at least in part on the capability message, a configuration for reporting perception information. The transmission component 704 may transmit, based at least in part on the configuration, an environment awareness report that indicates the perception information.

The reception component 702 may receive, via DCI, a MAC-CE, or an upper layer protocol, signaling that indicates perception information. The communication manager 706 may capture, via one or more sensors, sensor information. The communication manager 706 may detect or predict an event based at least in part on the sensor information, wherein the environment awareness report is triggered based at least in part on the event.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
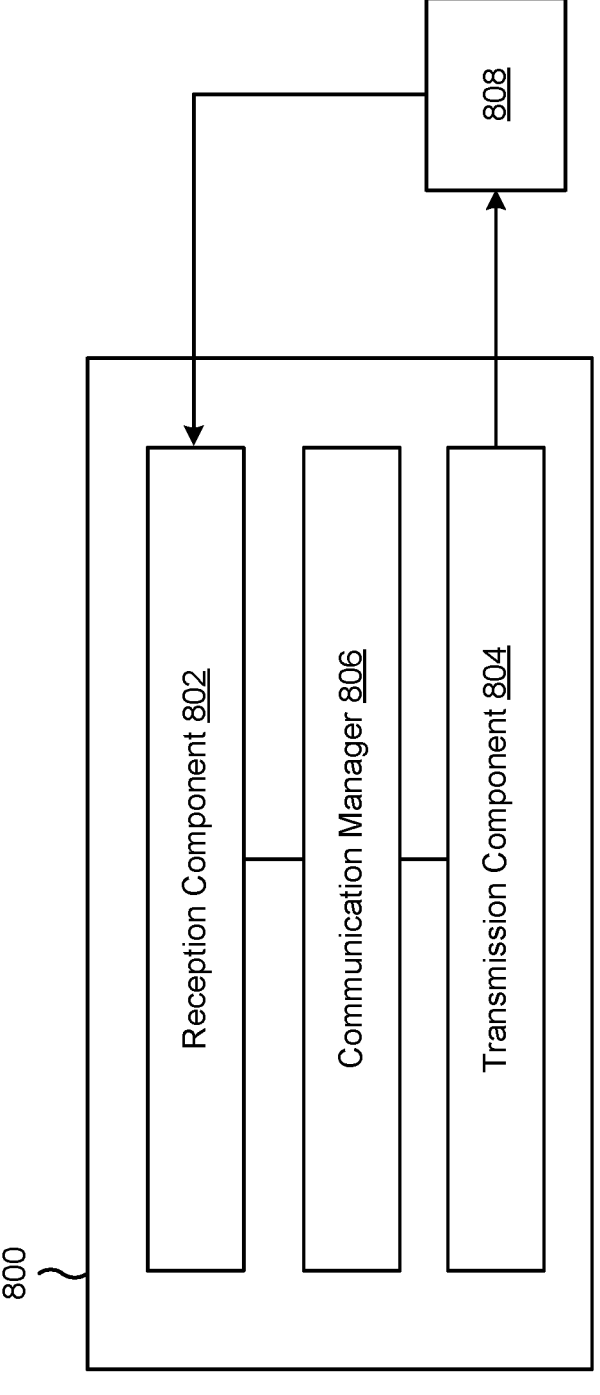

FIG. 8 is a diagram of an example apparatus 800 for wireless communication, in accordance with the present disclosure. The apparatus 800 may be a network node, or a network node may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 150 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the network node described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 802 and/or the transmission component 804 may include or may be included in a network interface. The network interface may be configured to obtain and/or output signals for the apparatus 800 via one or more communications links, such as a backhaul link, a midhaul link, and/or a fronthaul link.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 804 may be co-located with the reception component 802 in one or more transceivers.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The reception component 802 may receive a capability message indicating that a UE is capable of perception with respect to a surrounding environment. The transmission component 804 may transmit, based at least in part on the capability message, a configuration for reporting perception information. The reception component 802 may receive, based at least in part on the configuration, an environment awareness report that indicates the perception information. The communication manager 806 may perform an action based at least in part on the environment awareness report.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: transmitting a capability message indicating that the UE is capable of perception with respect to a surrounding environment; receiving, based at least in part on the capability message, a configuration for reporting perception information; and transmitting, based at least in part on the configuration, an environment awareness report that indicates the perception information.

Aspect 2: The method of Aspect 1, wherein the capability message indicates one or more sensors associated with the UE, and the one or more sensors enable the UE to perceive the surrounding environment.

Aspect 3: The method of any of Aspects 1-2, wherein the capability message indicates a type of perception for which the UE is capable.

Aspect 4: The method of any of Aspects 1-3, wherein the configuration for reporting perception information configures the UE to report one or more of: sensor information, radio frequency (RF) map information that indicates anchor positions, or information regarding static blockers.

Aspect 5: The method of any of Aspects 1-4, wherein the configuration for reporting perception information configures the UE to report static information, and the static information is transmitted via a radio resource control (RRC) layer 3 (L3) report.

Aspect 6: The method of any of Aspects 1-5, wherein the configuration for reporting perception information configures the UE to report dynamic information, and the dynamic information is transmitted via a layer 1 (L1) report or a layer 2 (L2) report.

Aspect 7: The method of any of Aspects 1-6, further comprising: receiving, via downlink control information (DCI), a medium access control control element (MAC-CE), or an upper layer protocol, signaling that indicates perception information.

Aspect 8: The method of any of Aspects 1-7, further comprising: capturing, via one or more sensors, sensor information; and detecting or predicting an event based at least in part on the sensor information, wherein the environment awareness report is triggered based at least in part on the event.

Aspect 9: The method of any of Aspects 1-8, wherein the environment awareness report is initiated by the UE, and the environment awareness report is a perception based triggered report.

Aspect 10: The method of any of Aspects 1-9, wherein the perception information is first perception information, and further comprising: transmitting a cancellation report indicating second perception information that overrides the first perception information.

Aspect 11: A method of wireless communication performed by a network node, comprising: receiving a capability message indicating that a user equipment (UE) is capable of perception with respect to a surrounding environment; transmitting, based at least in part on the capability message, a configuration for reporting perception information; and receiving, based at least in part on the configuration, an environment awareness report that indicates the perception information.

Aspect 12: The method of Aspect 11, further comprising: performing an action based at least in part on the environment awareness report.

Aspect 13: The method of any of Aspects 11-12, wherein the capability message indicates one or more sensors associated with the UE, and the one or more sensors enable the UE to perceive the surrounding environment.

Aspect 14: The method of any of Aspects 11-13, wherein the capability message indicates a type of perception for which the UE is capable.

Aspect 15: The method of any of Aspects 11-14, wherein the configuration for reporting perception information configures the UE to report one or more of: sensor information, radio frequency (RF) map information that indicates anchor positions, or information regarding static blockers.

Aspect 16: The method of any of Aspects 11-15, wherein the configuration for reporting perception information configures the UE to report static information, and the static information is received via a radio resource control (RRC) layer 3 (L3) report.

Aspect 17: The method of any of Aspects 11-16, wherein the configuration for reporting perception information configures the UE to report dynamic information, and the dynamic information is received via a layer 1 (L1) report or a layer 2 (L2) report.

Aspect 18: The method of any of Aspects 11-17, further comprising: transmitting, via downlink control information (DCI), a medium access control control element (MAC-CE), or an upper layer protocol, signaling that indicates perception information.

Aspect 19: The method of any of Aspects 11-18, wherein the environment awareness report is initiated by the UE, and the environment awareness report is a perception based triggered report.

Aspect 20: The method of any of Aspects 11-19, wherein the perception information is first perception information, and further comprising: receiving a cancellation report indicating second perception information that overrides the first perception information.

Aspect 21: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-10.

Aspect 22: An apparatus for wireless communication at a device, the apparatus comprising one or more memories and one or more processors coupled to the one or more memories, the one or more processors configured to cause the device to perform the method of one or more of Aspects 1-10.

Aspect 23: An apparatus for wireless communication, the apparatus comprising at least one means for performing the method of one or more of Aspects 1-10.

Aspect 24: A non-transitory computer-readable medium storing code for wireless communication, the code comprising instructions executable by one or more processors to perform the method of one or more of Aspects 1-10.

Aspect 25: A non-transitory computer-readable medium storing a set of instructions for wireless communication, the set of instructions comprising one or more instructions that, when executed by one or more processors of a device, cause the device to perform the method of one or more of Aspects 1-10.

Aspect 26: A device for wireless communication, the device comprising a processing system that includes one or more processors and one or more memories coupled with the one or more processors, the processing system configured to cause the device to perform the method of one or more of Aspects 1-10.

Aspect 27: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 11-20.

Aspect 28: An apparatus for wireless communication at a device, the apparatus comprising one or more memories and one or more processors coupled to the one or more memories, the one or more processors configured to cause the device to perform the method of one or more of Aspects 11-20.

Aspect 29: An apparatus for wireless communication, the apparatus comprising at least one means for performing the method of one or more of Aspects 11-20.

Aspect 30: A non-transitory computer-readable medium storing code for wireless communication, the code comprising instructions executable by one or more processors to perform the method of one or more of Aspects 11-20.

Aspect 31: A non-transitory computer-readable medium storing a set of instructions for wireless communication, the set of instructions comprising one or more instructions that, when executed by one or more processors of a device, cause the device to perform the method of one or more of Aspects 11-20.

Aspect 32: A device for wireless communication, the device comprising a processing system that includes one or more processors and one or more memories coupled with the one or more processors, the processing system configured to cause the device to perform the method of one or more of Aspects 11-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors coupled to the one or more memories, the one or more processors individually or collectively configured to:
      transmit a capability message indicating that the UE is capable of perception with respect to a surrounding environment;
      receive, based at least in part on the capability message, a configuration for reporting perception information;
      transmit, based at least in part on the configuration, an environment awareness report that indicates first perception information; and
      transmit a cancellation report indicating second perception information that overrides the first perception information.

2. The apparatus of claim 1, wherein the capability message indicates one or more sensors associated with the UE, and the one or more sensors enable the UE to perceive the surrounding environment.

3. The apparatus of claim 1, wherein the capability message indicates a type of perception for which the UE is capable.

4. The apparatus of claim 1, wherein the configuration for reporting perception information configures the UE to report one or more of: sensor information, radio frequency (RF) map information that indicates anchor positions, or information regarding static blockers.

5. The apparatus of claim 1, wherein the configuration for reporting perception information configures the UE to report static information, and the static information is transmitted via a radio resource control (RRC) layer 3 (L3) report.

6. The apparatus of claim 1, wherein the configuration for reporting perception information configures the UE to report dynamic information, and the dynamic information is transmitted via a layer 1 (L1) report or a layer 2 (L2) report.

7. The apparatus of claim 1, wherein the one or more processors are further individually or collectively configured to:

receive, via downlink control information (DCI), a medium access control control element (MAC-CE), or an upper layer protocol, signaling that indicates perception information.

8. The apparatus of claim 1, wherein the one or more processors are further individually or collectively configured to:

capture, via one or more sensors, the perception information; and detect or predict an event based at least in part on the perception information, wherein the environment awareness report is triggered based at least in part on the event.

9. The apparatus of claim 1, wherein the environment awareness report is initiated by the UE, and the environment awareness report is a perception based triggered report.

10. The apparatus of claim 1, wherein the one or more processors are further individually or collectively configured to:

detect or predict, based at least in part on sensor information, an event associated with at least one of a blockage, a motion speed, a location within or outside a defined area, or an expected handover of the user equipment; and wherein the environment awareness report indicates at least one of: a duration of the blockage, a position of a blocker, a motion speed based at least in part on translation or rotation, the location, or the expected handover.

11. An apparatus for wireless communication at a network node, comprising:

one or more memories; and one or more processors coupled to the one or more memories, the one or more processors individually or collectively configured to:

receive a capability message indicating that a user equipment (UE) is capable of perception with respect to a surrounding environment;

transmit, based at least in part on the capability message, a configuration for reporting perception information;

receive, based at least in part on the configuration, an environment awareness report that indicates first perception information; and receive a cancellation report indicating second perception information that overrides the first perception information.

12. The apparatus of claim 11, wherein the one or more processors are further individually or collectively configured to:

perform an action based at least in part on the environment awareness report.

13. The apparatus of claim 11, wherein:

the capability message indicates one or more sensors associated with the UE, and the one or more sensors enable the UE to perceive the surrounding environment; or the capability message indicates a type of perception for which the UE is capable.

14. The apparatus of claim 11, wherein:

the configuration for reporting perception information configures the UE to report one or more of: sensor information, radio frequency (RF) map information that indicates anchor positions, or information regarding static blockers;

the configuration for reporting perception information configures the UE to report static information, and the static information is transmitted via a radio resource control (RRC) layer 3 (L3) report; or the configuration for reporting perception information configures the UE to report dynamic information, and the dynamic information is transmitted via a layer 1 (L1) report or a layer 2 (L2) report.

15. The apparatus of claim 11, wherein the one or more processors are further individually or collectively configured to:

transmit, via downlink control information (DCI), a medium access control control element (MAC-CE), or an upper layer protocol, signaling that indicates perception information.

16. A method of wireless communication performed by a user equipment (UE), comprising:

transmitting a capability message indicating that the UE is capable of perception with respect to a surrounding environment;

receiving, based at least in part on the capability message, a configuration for reporting perception information;

transmitting, based at least in part on the configuration, an environment awareness report that indicates first perception information; and transmitting a cancellation report indicating second perception information that overrides the first perception information.

17. The method of claim 16, wherein:

the capability message indicates one or more sensors associated with the UE, and the one or more sensors enable the UE to perceive the surrounding environment; or the capability message indicates a type of perception for which the UE is capable.

18. The method of claim 16, wherein:

the configuration for reporting perception information configures the UE to report one or more of: sensor information, radio frequency (RF) map information that indicates anchor positions, or information regarding static blockers;

the configuration for reporting perception information configures the UE to report static information, and the static information is transmitted via a radio resource control (RRC) layer 3 (L3) report; or the configuration for reporting perception information configures the UE to report dynamic information, and the dynamic information is transmitted via a layer 1 (L1) report or a layer 2 (L2) report.

19. The method of claim 16, further comprising:

capturing, via one or more sensors, sensor information; and detecting or predicting an event based at least in part on the sensor information, wherein the environment awareness report is triggered based at least in part on the event, the environment awareness report is initiated by the UE, and the environment awareness report is a perception based triggered report.

20. The method of claim 16, further comprising:

detecting or predicting, based at least in part on sensor information, an event comprising at least one of:

a blockage resulting in a reference signal received power (RSRP) drop exceeding a threshold, a motion speed exceeding a threshold and based at least in part on translation or rotation, a location of the user equipment within or outside a defined area, or an expected handover of the user equipment, and wherein the environment awareness report is triggered based at least in part on the detected or predicted event and indicates at least one of: a duration of the blockage, a position of a blocker, the motion speed, the location, or the expected handover.

* * * * *